(12) United States Patent
Kusuura (10) Patent No.: US 8,413,462 B2
(45) Date of Patent: Apr. 9, 2013

(54) SYSTEMS, MATERIALS, AND PROCESSES FOR ISOLATING NANOPARTICLES

(75) Inventor: Takahisa Kusuura, Kanagawa (JP)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/132,890

(22) PCT Filed: Mar. 7, 2011

(86) PCT No.: PCT/US2011/027424
§ 371 (c)(1),
(2), (4) Date: Jun. 3, 2011

(87) PCT Pub. No.: WO2012/121703
PCT Pub. Date: Sep. 13, 2012

(65) Prior Publication Data
US 2012/0227439 A1    Sep. 13, 2012

(51) Int. Cl.
*B01D 9/04* (2006.01)
*F25C 1/18* (2006.01)
*B03D 1/001* (2006.01)

(52) U.S. Cl.
USPC .................................. 62/532; 62/67; 252/60

(58) Field of Classification Search ............... 62/67, 532; 252/60
See application file for complete search history.

(56) References Cited

U.S. PATENT DOCUMENTS

| | | | |
|---|---|---|---|
| 3,276,994 A | 10/1966 | Andrews | |
| 3,283,522 A | 11/1966 | Ganiaris | |
| 4,484,409 A | 11/1984 | Caple et al. | |
| 5,627,051 A | 5/1997 | Duman | |
| 5,654,279 A | 8/1997 | Rubinsky et al. | |
| 6,391,224 B1 | 5/2002 | Wowk | |
| 6,616,858 B2 | 9/2003 | Fahy et al. | |
| 7,127,913 B2 * | 10/2006 | Witkamp et al. | 62/532 |
| 7,381,465 B2 | 6/2008 | Torimoto et al. | |
| 7,442,769 B2 | 10/2008 | Hoshino et al. | |
| 7,736,629 B2 | 6/2010 | Kamath et al. | |
| 7,820,921 B2 | 10/2010 | Feist et al. | |
| 2007/0012189 A1 | 1/2007 | Kang et al. | |

(Continued)

FOREIGN PATENT DOCUMENTS

| JP | 61254288 A | 11/1986 |
|---|---|---|
| JP | 2007-173041 | 7/2007 |

(Continued)

OTHER PUBLICATIONS

Qian et al., "Controlled freezing and freeze drying: a versatile route for porous and micro-/nano-structured materials", J Chem Technol Biotechnol 2011; 86: 172-184, Jul. 2010.*

(Continued)

*Primary Examiner* — Marc Norman
*Assistant Examiner* — Filip Zec
(74) *Attorney, Agent, or Firm* — Knobbe, Martens, Olson & Bear LLP (57) ABSTRACT

Processes for isolating nanoparticles from an aqueous solution are disclosed. The processes can include, for example, providing an aqueous mixture having a plurality of nanoparticles and at least one thermal hysteresis molecule; adjusting the aqueous mixture to a temperature effective to form ice crystals within the aqueous mixture; and isolating the ice crystals from the aqueous mixture. Also disclosed are compositions and systems for isolating nanoparticles.

20 Claims, 2 Drawing Sheets

U.S. PATENT DOCUMENTS

| | | | |
|---|---|---|---|
| 2008/0023494 A1 | 1/2008 | Liang | |
| 2008/0206562 A1 | 8/2008 | Stucky et al. | |
| 2010/0020846 A1* | 1/2010 | Kagan et al. | 374/141 |
| 2011/0091711 A1* | 4/2011 | Neivandt et al. | 428/304.4 |

FOREIGN PATENT DOCUMENTS

| | | |
|---|---|---|
| JP | 2009-167292 | 7/2009 |
| RU | 2104952 C1 | 2/1998 |
| WO | WO96/30459 | 10/1996 |
| WO | WO99/18169 | 4/1999 |
| WO | WO00/00512 | 1/2000 |

OTHER PUBLICATIONS

Birnbaum et al., "Optimization of preparation techniques for poly(lactic acid-co-glycolic acid) nanoparticles", Journal of Nanoparticle Research 2: 173-181, 2000.*

Lu, "Microstructural Evolution of Nanoparticle Aqueous Colloidal Suspensions During Freeze Casting", J. Am. Ceram. Soc., 90 [12] 3753-3758 (2007).*

Du et al., "Ice Nucleation Inhibition; Mechanism of Antifreeze by Antifreeze Protein", The Journal of Biological Chemistry vol. 278, No. 38, Issue of Sep. 19, 2003, pp. 36000-36004.*

Antifreeze protein, Wikipedia, the free encyclopedia, http://en.wikipedia.org/wiki/Antifreeze_protein downloaded on Mar. 28, 2011.

Bargelloni, et al., "Molecular Evolution at Subzero Temperatures: Mitochondrial and Nuclear Phylogenies of Fishes from Antarctica . . . ," *Mol. Biol. Evol.* 11(6):854-863, 1994.

Bukharin, Oleg, "Russia's Gaseous Centrifuge Technology and Uranium Enrichment Complex," Program on Science and Global Security, Woodrow Wilson School of Public and International Affairs, Princeton University, Jan. 2004.

Choi, Young Eun, "A Study on the Hyperactive Antifreeze Proteins from the Insect *Tenebrio molitor*," thesis to College of Arts and Sciences of Ohio University, Nov. 2007.

Davies, et al., "Biochemistry of fish antifreeze proteins," *The FASEB Journal*, vol. 4, pp. 2460-2468, May 1990.

Davies, et al., "Structure and function of antifreeze proteins," *Phil. Trans. R. Soc. Lond.* 357, pp. 927-935, 2002.

Evans, et al., "How do Antarctic notothenioid fishes cope with internal ice? . . . ," *Antarctic Science*, 2010.

Hon, et al., "Antifreeze Proteins in Winter Rye Are Similar to Pathogenesis-Related Proteins," *Plant Physiol.* 109:879-889, 1995.

"How the CINC Centrifuge Works," http-www.cincmfg.com-How_our_Centrifuges_Work_s-108.htm, downloaded Mar. 28, 2011.

http://www.jsrae.or.jp/annai/yougo/48.html Water freezing, downloaded May 23, 2011.

http://www.pu-toyama.ac.jp/ES/senryaku/senryaku05/junkan020102.html—Freezing of moisture in atmosphere (snow), downloaded May 23, 2011.

http://www.redorbit.com/news/science/1799347/new_antifreeze_molecule_isolated_in_alaska_beetle/index.html, downloaded Mar. 28, 2011.

Matsumura, et al., "Ploypmpholytes as Low Toxic Efficient Cryoprotective Agents with Antifreeze Protein Properties," Biomaterials 30 (2009) 4842-4849.

Nicolet, et al., "Single Ice Crystal Measurements During Nucleation Experiments with the Depolarization Detector IODE," Atmos. Chem. Phys., 10, 313-325, 2010.

Raymond, et al., "Adsorptioni Inhibition as a Mechanism of Freezing Resistance in Polar Fishes," Proc. Natl. Acad. Sci., vol. 74, No. 6, pp. 2589-2593, Jun. 1977.

Smallwood, et al., "Isolation and Characterization of a Novel Antifreeze Protein from Carrot (*Daucus carota*)," Biochem. J., 340, 385-391 (1999).

Sönnichsen, et al., "Comparative Modeling of the Three-Dimensional Structure of Type II Antifreeze Protein," Protein Science, 4:460-471 (1995).

Thenmozhi, T., "Sequence Analysis of Anti-Freeze Protein," Thesis for Annamalai University, 2006.

Varga, et al., "Vitrification of In Vitro Matured Oocytes of Mangalica and Large White Pigs," Acta Veterinaria Hungarica, 56 (3), pp. 399-410 (2008).

Wu, D. et al., "Purification and characterization of antifreeze proteins from larvae of the beetle *Dendroides canadensis*," *J. Comp. Physiol. B*. 161:271-278, 1991.

International Search Report and Written Opinion dated May 23, 2011, Intl. application No. PCT/US2011/027424, filed Mar. 7, 2011.

* cited by examiner

SYSTEMS, MATERIALS, AND PROCESSES FOR ISOLATING NANOPARTICLES

CROSS-REFERENCE TO RELATED APPLICATIONS

This application is the U.S. National Phase under 35 U.S.C. §371 of International Application No. PCT/US2011/027424, filed Mar. 7, 2011. The International Application was filed in English. The contents of the International Application are hereby incorporated by reference in their entirety.

BACKGROUND

1. Field

The present application relates to methods of isolating nanoparticles from a composition.

2. Description of the Related Art

Numerous consumer products include nanoparticles that can be discharged into waste water streams. Increasing evidence suggests that several classes of nanoparticles may accumulate in sludge derived from wastewater treatment and ultimately in soil following land application as biosolids. These nanoparticles may accumulate in the food chain and pose a health risk. Thus, there is a rising need to remove these nanoparticles from waste water streams.

Typical methods for isolating nanoparticles include filtering solution to remove the nanoparticles. But these methods require filters with very small pore sizes to remove nanometer-sized particles. Because the small pore size requires high pressures and/or low flow rates, this process can be inefficient.

An alternative process for removing nanoparticles is aggregating the nanoparticles to increase the particle size. While this method can be effective for high nanoparticle concentrations, it may not work effectively at low concentrations because the amount of nanoparticles is insufficient to obtain significant aggregation.

SUMMARY

A process for isolating nanoparticles from a mixture is disclosed. The process includes: providing an aqueous mixture having a plurality of nanoparticles and at least one thermal hysteresis molecule; adjusting the aqueous mixture to a temperature effective to form ice crystals within the aqueous mixture, in which the ice crystals include at least a portion of the nanoparticles; and isolating the ice crystals from the aqueous mixture.

In some embodiments, the isolating step includes separating the ice crystals based on specific density. In some embodiments, the isolating step includes centrifuging the aqueous mixture.

In some embodiments, the isolating step includes filtering the ice crystals from the mixture. In some embodiments, the filtering step is configured to remove components having a size greater than about 1 µm.

In some embodiments, the temperature is equal to or less than about 0° C. In some embodiments, the temperature is equal to or less than about −0.5° C. In some embodiments, the temperature is equal to or greater than about −40° C. In some embodiments, the aqueous mixture is maintained at the temperature during the isolating step.

In some embodiments, the ice crystals have an average size of at least about 5 µm. In some embodiments, the ice crystals have an average size equal to or less than about 250 µm.

In some embodiments, the nanoparticles have an average size equal to or less than about 500 nm. In some embodiments, the nanoparticles have an average size equal to or less than about 100 nm.

In some embodiments, the nanoparticles include at least one inorganic material. In some embodiments, the inorganic material is selected from metals and ceramics. In some embodiments, the inorganic material includes gold, silver, copper, cadmium, lead, selenium, mercury, or combinations thereof. In some embodiments, the nanoparticles include at least one synthetic polymer.

In some embodiments, the aqueous mixture includes at least 50% water by volume. In some embodiments, the aqueous mixture includes at least 80% water by volume water. In some embodiments, the aqueous mixture includes a solvent that is essentially water.

In some embodiments, the thermal hysteresis molecule is present in the aqueous mixture at a concentration of at least about 1 µg/mL. In some embodiments, the thermal hysteresis molecule is present in the aqueous mixture at a concentration of at least about 100 µg/mL. In some embodiments, the thermal hysteresis molecule is present in the aqueous mixture at a concentration equal to or less than 50 mg/mL.

In some embodiments, the aqueous mixture includes at least about 10 ppm of nanoparticles.

In some embodiments, the thermal hysteresis molecule is an antifreeze protein or an antifreeze glycoprotein. In some embodiments, the thermal hysteresis molecule is a Type I antifreeze protein. In some embodiments, the thermal hysteresis molecule is a Type II antifreeze protein. In some embodiments, the thermal hysteresis molecule is a Type III antifreeze protein. In some embodiments, the thermal hysteresis molecule is an antifreeze glycoprotein.

In some embodiments, the thermal hysteresis molecule is a synthetic organic compound. In some embodiments, the thermal hysteresis molecule is a polymer. In some embodiments, the polymer is a polycarboxylic acid, a polyglycerol, a methyl acrylate-co-vinyl pyrrolidone, a methyl methacrylate-co-vinyl-pyrrolidone, polyvinyl acetate, polyvinyl alcohol, or combinations thereof.

In some embodiments, at least about 50% by weight of the nanoparticles are isolated from the aqueous mixture.

Some embodiments disclosed herein include a composition for isolating nanoparticles, the composition comprising: a solvent comprising water; a plurality of nanoparticles; and a thermal hysteresis molecule. In some embodiments, the solvent includes at least 80% water by volume. In some embodiments, the plurality of nanoparticles include at least one inorganic material. In some embodiments, the thermal hysteresis molecule is an antifreeze protein or an antifreeze glycoprotein.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Disclosed herein are processes for isolating nanoparticles. Some embodiments of these processes include forming ice crystal containing nanoparticles and isolating these nanoparticles. The processes disclosed herein may, for example, be advantageous because it permits isolating nanoparticles at low concentrations without the need for inefficient filtering or aggregation procedures. Also disclosed herein are compositions for isolating nanoparticles.

Unless otherwise specifically noted herein, the terms set forth below will have the following definitions.

As used herein, a "nanoparticle" refers to any particle having a greatest dimension (e.g., diameter) that is less than about 2500 nm. In some embodiments, the nanoparticle is a solid or a semi-solid.

As used herein, a "thermal hysteresis molecule" is a molecule that creates a difference between the freezing point and the melting point of a mixture. For example, adding a thermal hysteresis molecule to pure water may decrease the freezing point to about −1° C. relative to a melting point of about 0° C. The thermal hysteresis can be determined, for example, using a nanolitre osmometre.

Process for Isolating Nanoparticles

Figure 1:
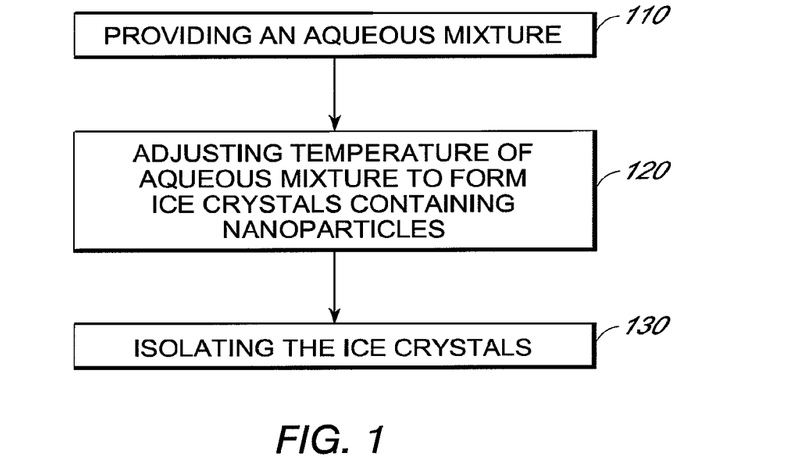
FIG. 1 is an illustrative embodiment of a process for isolating nanoparticles.

FIG. 1 is a flow chart representing one embodiment of the processes disclosed herein. An aqueous mixture having a plurality of nanoparticles and at least one thermal hysteresis molecule is provided at step 110. For example, a thermal hysteresis molecule may be combined with an aqueous mixture (e.g., solution) containing nanoparticles. The temperature of the aqueous mixture may then be adjusted to form ice crystals containing at least a portion of the nanoparticles at step 120. The ice crystals can then be isolated from the mixture at step 130. As would be appreciated by the skilled artisan, guided by the teaching of the present application, each step can be completed in sequence, or one or more steps can be completed at about the same time. As one example, the temperature of the aqueous mixture may be adjusted at about the same time as combining a thermal hysteresis molecule with an aqueous mixture containing nanoparticles.

Returning to step 110 in FIG. 1, the composition of the aqueous mixture is not particularly limited. The aqueous mixture can include water, nanoparticles and thermal hysteresis molecules. The various components may be mixed together to form a dispersion.

The aqueous mixture may, in some embodiments, include a sufficient amount of water such that ice crystals form. For example, the aqueous mixture may include water and ethanol as solvents. The relative volume of water to ethanol can be greater than the eutectic point such that ice crystals form. The aqueous mixture may, in some embodiments, include a sufficient amount of water such that the water exhibits thermal hysteresis. That is, the amount of water is sufficient such that the melting point of the water within the mixture is greater than the freezing point. The amount of water sufficient to form crystals will vary with the given solvent system (e.g., water/ethanol versus water/acetone). The skilled artisan, guided by the teachings of the present application, can readily determine the amount water sufficient to form crystal in any given mixture by, for example, using a nanolitre osmometre.

The amount of water within the mixture relative to other solvents may, for example, be at least about 50% water by volume; at least about 60% water by volume; at least about 70% water by volume; at least about 80% water by volume; at least about 90% water by volume; at least about 95% water by volume; at least about 97% water by volume; at least about 99% water by volume. In some embodiments, the aqueous mixture includes a solvent that consists essentially of water. That is, the solvent includes water and any other solvent, so long as the amount of water is sufficient to permit forming ice crystals. In some embodiments, the aqueous mixture includes a solvent that consists of water.

In some embodiments, the aqueous mixture may include at least one organic solvent. The organic solvent may, for example, be a non-polar solvent, a polar aprotic solvent, a polar protic solvent, or combinations thereof. In some embodiments, the organic solvent is miscible with water (e.g., a polar aprotic solvent or a polar protic solvent). Non-limiting examples of organic solvents miscible with water include ketones, ethers, and organic acids such as acetone, tetrahydrofuran, and acetic acid. The amount of organic solvent in the aqueous mixture relative to other solvents may be, for example, equal to or less than about 50% by volume; equal to or less than about 40% by volume; equal to or less than about 30% by volume; equal to or less than about 20% by volume; equal to or less than about 10% by volume; equal to or less than about 5% by volume; equal to or less than about 3% by volume; or equal to or less than about 1% by volume. In some embodiments, the aqueous solution is substantially free of an organic solvent.

The nanoparticles within the aqueous mixture are also not particularly limited. The nanoparticle may, for example, include an inorganic material. The inorganic material can, in some embodiments, include a metal, a ceramic, or combinations thereof. Non-limiting examples of a metal include any material that includes gold, silver, copper, cadmium, lead, selenium, mercury, or combinations thereof. These metals can be in a pure metal, an alloy, or a metal oxide. One example of a ceramic would be silicon dioxide; however, the present application is not limited to any particular materials. The nanoparticles can all be of one type of nanoparticles, or can include mixtures of two or more different nanoparticles.

In some embodiments, the nanoparticle may include at least one polymer. Some examples of polymers include, but are not limited to, polyethylene oxide (PEO), polyvinyl pyrrolidone (PVP), poly(2-ethyl-2-oxazoline) (POZ), poly(1-trimethylsilyl-1-propyne) (PTMSP), polydimethylsiloxane (PDMS), poly(ethylene-co-propylene) (EPR), ethylene-propylene-butadiene terpolymer (EPDM), polyacrylate, and mixtures and copolymers thereof. The polymer may, for example, have a weight average molecular weight of at least about 1,000 Da; at least about 5,000 Da; at least about 10,000 Da; or at least about 50,000 Da. In some embodiments, the polymer is a synthetic polymer.

Other materials can be included in the nanoparticle. For example, the nanoparticle can include a fullerene, such as $C_{60}$ (i.e., a buckyball), a single-walled carbon nanotube, a multi-walled carbon nanotube, and the like.

The shape of the nanoparticles is not particularly limited and the process of the present application can be used with various nanoparticles having different geometries. For example, the nanoparticle may be centrosymetric, rod-shaped, and the like. In some embodiments, the nanoparticles are a "Janus particle" having two or more separate and distinct components.

The size of the nanoparticles is also not particularly limited. Without being restricted to any particular size, the processes of the present application are particularly advantageous for small nanoparticles (e.g., less than about 50 nm in size). The nanoparticles may, for example, have an average size (e.g., diameter) of less than about 2,500 nm; less than about 2,000 nm; less than about 1,000 nm; less than about 750 nm; less than about 500 nm; less than about 250 nm; less than about 100 nm; less than about 75 nm; less than about 50 nm; less than about 40 nm; less than about 30 nm; or less than about 20 nm. The nanoparticles may, for example, have an average size of at least about 5 nm; at least about 10 nm; at least about 20 nm; at least about 30 nm; at least about 40 nm; or at least about 50 nm. As one example, the nanoparticles may have an average size in the range of about 10 nm to about 20 nm.

Some non-limiting examples of nanoparticles that may be isolated according to the methods disclosed herein are provided in U.S. Publication No. 2007/0012189; U.S. Pat. No. 7,820,921; U.S. Publication No. 2008/0206562; U.S. Publication No. 2008/0234394 and U.S. Pat. No. 7,381,465.

Various amounts of nanoparticles may be within the aqueous mixture. In some embodiments, the aqueous mixture includes an amount of nanoparticles greater than a predetermined threshold. For example, it may be determined that a concentration of nanoparticles above 500 ppm is not desirable. Thus, the aqueous mixture could include a nanoparticle concentration of about 500 ppm or more. In some embodiments, the aqueous mixture is identified as a mixture requiring removal of at least a portion of the nanoparticles. The aqueous mixture may, for example, include at least about 10 ppm of nanoparticles; at least about 25 ppm of nanoparticles; at least about 50 ppm of nanoparticles; at least about 100 ppm of nanoparticles; at least about 250 ppm of nanoparticles; at least about 500 ppm of nanoparticles; at least about 1 g/L of nanoparticles; or at least about 5 g/L of nanoparticles. The aqueous mixture may, for example, have an amount of nanoparticles equal to or less than about 20 g/L; include equal to or less than about 10 g/L; equal to or less than about 5 g/L; equal to or less than about 1 g/L; equal to or less than about 750 ppm; equal to or less than about 500 ppm; equal to or less than about 250 ppm; or equal to or less than about 100 ppm. As one example, the aqueous mixture may have an amount of nanoparticles in the range of about 10 ppm to about 1 g/L.

The present application is also not limited to any particular thermal hysteresis molecule. Numerous thermal hysteresis molecules are known in the art and it is contemplated that the process of the present application can include any one of these known thermal hysteresis molecules.

One class of thermal hysteresis molecules are antifreeze proteins and antifreeze glycoproteins. The antifreeze protein and glycoprotein is well-known and widely reported. Many of the protein sequences for these antifreeze proteins have been determined and are available through public databases. TABLE 1 provides a non-limiting list of antifreeze proteins and glycoproteins reported in the literature. Many of these molecules are derived from fish; however, numerous other animals and plants have been found to include antifreeze proteins. TABLE 2 provides some non-limiting examples antifreeze proteins and glycoproteins derived from non-fish animals and plants.

Antifreeze proteins and glycoproteins are described in various publications, such as (i) P.C.T. Publication No. WO 2000/00512; (ii) Raymond, J. and DeVries, A. *Absorption inhibition as a mechanism of freezing resistance in polar fishes,* Proc. Natl. Acad. Sci. USA 74(6):2589-93 (1977); (iii) Davies, P. et al. *Structure and function of antifreeze proteins,* Phil. Trans. R. Soc. Lond. B 357:927-935 (2002); (iv) Davies, P. and Hew, C. *Biochemistry of fish antifreeze proteins,* The FASEB J. 4: 2460-2468 (1990); (v) U.S. Pat. No. 5,627,051; (vi) Hon, W. et al. *Antifreeze Proteins in Winter Rye Are Similar to Pathogenesis-Related Proteins,* Plant Physiol. 109: 879-899 (1995); (vii) Smallwood, M. et al. *Isolation and characterization of a novel antifreeze protein from carrot (Daucus carota),* Biochem. J. 340:385-91 (1999); and (viii) U.S. Pat. No. 5,654,279.

Antifreeze proteins are known to include at least three classes of proteins: (i) Type I proteins are alanine-rich polypeptides having a molecular weight in the range of about 3,000 Da to about 5,000 Da; (ii) Type II proteins are cysteine-rich polypeptides having a molecular weight of about 12,000 Da; and (iii) Type III proteins that are not rich in cysteine or alanine and have a molecular weight of about 6,000 Da. Meanwhile, antifreeze glycoproteins include alanine, threonine, and Gal-GalNAc, and have a molecular weight of about 2,700 Da to about 36,000 Da.

Without being bound to any particular theory, it is believed that these animals and plants developed antifreeze proteins and glycoproteins to survive cold conditions. For example, most fish having antifreeze proteins are found in arctic waters where the temperature can reach below 0° C. Although the exact mechanism of action is still subject to debate, it is believed that antifreeze proteins absorb to the surface of a crystal to prevent the ice crystal from growing. Thus, an aqueous mixture containing an antifreeze protein can form small crystals at temperatures slightly below the melting point.

The antifreeze proteins and glycoproteins can, in some embodiments, be isolated from any of the particular species (or class of species) described in the present application. For example, the process could include an antifreeze protein isolated from carrots. The antifreeze proteins and glycoproteins can be extracted from a plant or animal by conventional methods. Isolation and purification of the proteins or glycoproteins can be readily achieved by chromatographic means, as well as absorption, precipitation, and evaporation. Other methods, many of which are described in the literature, can be used by the skilled artisan. The antifreeze proteins and glycoproteins may also be prepared synthetically using conventional chemical synthesis or with recombinant DNA technology.

TABLE 1

THERMAL HYSTERESIS PROTEINS OF FISH SPECIES

| Protein Type, Composition and Size | Source Fish Species | Trivial Name of Fish Species |
|---|---|---|
| Antifreeze glycoproteins (AFGPs): containing alanine, threonine and Gal-GalNAc disaccharide: M.W.: 2,700-36,000 | Antarctic notothenioids: *Pagothenia borchgrevinki* *Trematomus borchgrevinki* *Trematomus bernachii* *Dissostichus mawsoni* | Antarctic cod |
| Antifreeze Polypeptides | Northern ocean gadoids: | |

TABLE 1-continued

THERMAL HYSTERESIS PROTEINS OF FISH SPECIES

| Protein Type, Composition and Size | Source Fish Species | Trivial Name of Fish Species |
|---|---|---|
| (AFPs), Type I: alanine-rich; M.W.: 3,000-5,000 | *Gadus agac* | Greenland cod |
| | *Gadus morhua* | Atlantic cod |
| | *Microgadus tomcod* | Atlantic tomcod |
| | *Boreogadus saida* | Arctic polar cod |
| | *Eligenus gracilis* | Saffron |
| | Righteye flounders: | |
| | *Pseudopleuronectus Americanus* | Winter flounder |
| | *Limanda ferruginea* | Yellowtail Flounder |
| Antifreeze Polypeptides (AFPs), Type II: cysteine-rich; homologous to C-type lectins; M.W.: 12,000 | Cottids: | |
| | *Myoxycephalus scorpius* | Shorthorn sculpin |
| | *Myoxycephalus aenaeus* | Grubby sculpin |
| | *Myoxycephalus scorpiodes* | Arctic sculpin |
| | Cottid: | |
| | *Hemitripterus americanus* | Sea raven |
| | *Osmerus mordex* | Smelt |
| | *Clupea harengus harengus* | Herring |
| Antifreeze Polypeptides (AFPs), Type III: no cysteines, and not rich in alanines; M.W.: 6,000 | Eel pouts: | |
| | *Macrozoarces americanus* | Ocean pout |
| | *Rhigophila dearborni* | Antartic eel pout |
| | *Lycodes Polaris* | Arctic eel pout |

TABLE II

NON-FISH SOURCES OF THERMAL HYSTERESIS PROTEINS

| | Species |
|---|---|
| A. Insects Other Than Beetles: Order | |
| Collembola | 7 spp. |
| Plecoptera | *Arcynopteryx compacta* |
| Orthoptera | *Parcoblata pennsylvanica* |
| Hemiptera | *Oncopeltus fasciatus* |
| Mecoptera | *Boreus westwoodi* |
| Lepidoptera | *Choristoneura fumiferana* |
| B. Coleoptera (Beetles): Family | |
| Tenebrionidae | *Tenebrio molitor* |
| | *Meracantha contracta* |
| | *Uloma impresssa* |
| | *Platydema* sp. |
| Elateridae | *Ampedus lineatus* |
| | *Ampedus* sp. |
| | *Lepidotus discoideus* |
| | *Melanotus* sp. |
| Cucujidae | *Cucujus clavipes* |
| Pyrochridae | *Dendroides Canadensis* |
| Lampyridae | *Photinus* sp. |
| Coccinellidae | *Coccinella novemnotata* |
| Scolytidae | *Ips acuminatus* |
| Cerambycidae | *Rhagium inquisitor* |
| C. Non-Insect Arthropods: Animal | |
| Spiders | *Philodromus* sp. |
| | *Clubiona* sp. |
| | *Bolyphantes index* |
| Centipede | *Lithobius forficatus* |
| Mite | *Alaskozetes antarcticus* |
| D. Other Invertebrates: | |
| Mussel | *Mytilus edulis* |
| E. Plants: | |
| Carrot | *Daucus carota* |
| Winter Rye | *Secale cereal* |

The thermal hysteresis molecule may also be a polymer. Non-limiting examples of polymers known to exhibit thermal hysteresis include, but are not limited to polycarboxylic acid, a polyglycerol, a methyl acrylate-co-vinyl pyrrolidone, a methyl methacrylate-co-vinyl-pyrrolidone, polyvinyl acetate, polyvinyl alcohol, and poly(vinyl alcohol-co-vinyl acetate). The thermal hysteresis properties of these polymers are described in (i) U.S. Pat. No. 4,484,409; (ii) U.S. Pat. No. 6,391,224; (iii) Japanese Unexamined Patent Publication No. 2009-167292; and (iv) U.S. Pat. No. 6,616,858. In some embodiments, the polymer is a polycarboxylic acid, such poly(acrylic acid), poly(methacrylic acid), and other carboxylic acid-containing acrylate polymers. The thermal hysteresis polymers can be used alone, or in combination with other polymers or thermal hysteresis molecules. For example, poly(acrylic acid) can be used in combination with an antifreeze protein.

Other organic compounds are known to exhibit thermal hysteresis and are within the scope of the present application. For example, 1,3-cis-cyclohexanediol has been shown to provide thermal hysteresis in P.C.T. Publication Nos. WO 1996/30459 and WO 1999/18169. Dimethylsulfoxide (DMSO) is also believed to function as a thermal hysteresis molecule.

Various combinations of thermal hysteresis molecules can be used in the method of isolating nanoparticles. For example, the aqueous solution could include one, two, three, or more antifreeze proteins or glycoproteins. As another example, the aqueous solution can include one, two, three, or more polymers that exhibit thermal hysteresis. In some embodiments, the aqueous solution includes at least one antifreeze protein or glycoprotein, and at least one polymer that exhibits thermal hysteresis.

The concentration of the thermal hysteresis molecule in the aqueous solution is not limited and will vary depending on various factors, such as the thermal hysteresis molecule and the amount of nanoparticles in the aqueous solution. A skilled artisan, guided by the teachings of the present application, can readily determine the appropriate amount of the thermal hysteresis molecule. The concentration of the thermal hysteresis molecule in the aqueous solution can be effective to produce a thermal hysteresis of at least about 0.1° C.; at least about 0.2° C.; at least about 0.3° C.; at least about 0.5° C.; at least about 1.0° C.; at least about 1.5° C.; at least about 2.0° C.; or at least about 3.0° C.

The concentration of the thermal hysteresis molecule can be, for example, at least about 10 µg/mL; at least about 50 µg/mL; at least about 100 µg/mL; at least about 500 µg/mL; at least about 1 mg/mL; at least about 2 mg/mL; at least about 5 mg/mL; at least about 10 mg/mL; at least about 30 mg/mL; at least about 50 mg/mL; or at least about 100 mg/mL. The concentration of the thermal hysteresis molecule can be, for example, less than or equal to about 300 mg/mL; less than or equal to about 200 mg/mL; less than or equal to about 100 mg/mL; less than or equal to about 50 mg/mL; less than or equal to about 30 mg/mL; less than or equal to about 10 mg/mL; less than or equal to about 5 mg/mL; or less than or equal to about 1 mg/mL.

The pH of the aqueous solution may alter the activity of the thermal hysteresis molecule. See e.g., Wu, D. et al., *Purification and characterization of antifreeze proteins from larvae of the beetle Dendroides canadenis*, J. Comp. Physiology B 161:271-278 (1991). Accordingly, the pH of the aqueous mixture may be optionally maintained or adjusted to modify the properties of the thermal hysteresis molecule. The skilled artisan, guided by the teachings of the present application, can determine an appropriate pH for isolating the nanoparticles. The appropriate pH may vary depending on various factors, such as the composition of the solution, the type of nanoparticles to be isolated, the specific thermal hysteresis molecule, and the like. The pH may, for example, be adjusted to or maintained at a pH before isolating the nanoparticles. In some embodiments, the pH of the aqueous mixture can be adjusted to or maintained at a pre-determined pH.

The pH of the aqueous mixture can be adjusted to or maintained at a pH of at least about 2; at least about 3; at least about 4; at least about 5; at least about 6; at least about 7; or at least about 7.5. The pH of the aqueous mixture can be adjusted to or maintained at a pH of less than or equal to about 12; less than or equal to about 11; less than or equal to about 10; less than or equal to about 9; or less than or equal to about 8. In some embodiments, the pH of the aqueous mixture can be adjusted to or maintained at a pH in the range of about 2 to about 12.

The pH of the aqueous mixture can, in some embodiments, be adjusted or maintained by adding a pH modifying agent. The pH modifying agents can include acidifying agents to lower pH, basifying agents to raise pH, and buffering agents to control pH within a desired range. Non-limiting examples of pH modifying agents include carboxylic acid, phosphoric and sulfonic acids, acid salts (e.g., monosodium citrate, disodium citrate, monosodium malate, etc.), alkali metal hydroxides such as sodium hydroxide, carbonates (e.g., sodium carbonate, bicarbonates, sesquicarbonates), borates, silicates, phosphates (e.g., monosodium phosphate, trisodium phosphate, pyrophosphate salts, etc.), imidazole and the like.

Returning again to FIG. 1, step 120 includes adjusting the temperature of the aqueous mixture to form ice crystals. The ice crystals can include at least a portion of the nanoparticles because the ice crystals preferentially form around the nanoparticles. Without being bound to any particular theory, it is believed that crystals preferentially include nanoparticles as a result of heterogeneous nucleation. Ice crystal formation generally includes two steps: nucleation and growth. Nucleation is the initial process where molecules arrange into a new crystal, while growth involves molecules adding to an existing crystal. It is believed the latter process is inhibited or retarded by thermal hysteresis molecules. Nucleation can occur by homogeneous nucleation or heterogeneous nucleation. Because heterogeneous nucleation includes a phase boundary or impurity that lowers the surface energy for forming the new crystal, heterogeneous nucleation occurs more often than homogenous nucleation. It is believed that nanoparticles in the aqueous solution function as impurities that are incorporated into the new crystal during heterogeneous nucleation.

Generally, the aqueous mixture can be adjusted to a temperature that is effective to form ice crystals within the aqueous mixture. The skilled artisan, guided by the teachings of the present application, can readily determine an appropriate temperature. Generally, the temperature should be low enough to form ice crystals but high enough to prevent the entire solution from freezing. The aqueous mixture can be adjusted to a temperature of, for example, equal to or less than about 0° C.; equal to or less than about −0.1° C.; equal to or less than about −0.2° C.; equal to or less than about −0.3° C.; equal to or less than about −0.5° C.; equal to or less than about −1.0° C.; equal to or less than about −1.5° C.; equal to or less than about −2.0° C.; or equal to or less than about −2.5° C. The aqueous mixture can be adjusted to a temperature of, for example, equal to or greater than about −40° C.; equal to or greater than about −30° C.; equal to or greater than about −20° C.; equal to or greater than about −10° C.; equal to or greater than about −8° C.; equal to or greater than about −5° C.; or equal to or greater than about −3° C.

The temperature of the aqueous mixture, in some embodiments, can be adjusted by cooling the aqueous mixture. For example, the aqueous mixture can be cooled from room temperature to about −1.0° C. In some embodiments, the temperature is adjusted to a predetermined temperature. The rate of cooling the aqueous mixture is not particular limited; however, the rate may affect crystal formation. Thus, in some embodiments, the aqueous mixture is cooled according to a predefined protocol. For example, the aqueous solution can be cooled at about 3° C./min or less until ice crystal have formed.

The size of the ice crystal can vary depending upon numerous factors. For example, the size and geometry of the ice crystal may vary depending upon the specific thermal hysteresis molecule and it concentration. The temperature may also affect crystal size. The ice crystal can have an average size of, for example, at least about 1 μm; at least about 4 μm; at least about 8 μm; at least about 10 μm; at least about 12 μm; or at least about 15 μm. The ice crystal can have an average size of, for example, less than or equal to about 250 μm; less than or equal to about 100 μm; less than or equal to about 50 μm; less than or equal to about 30 μm; less than or equal to about 25 μm; or less than or equal to about 20 μm.

Returning again to FIG. 1, step 130 includes isolating ice crystals containing from the aqueous mixture, where the ice crystals contain at least a portion of the nanoparticles.

The method of isolating the ice crystals is also not particularly limited. In some embodiments, isolating the ice crystals includes separating the ice crystals based on specific density. Because ice has a lower density than water (e.g., ice can be about 0.92 g/cm$^3$ and water can be about 1.0 g/cm$^3$), the ice crystals can be separated based on the specific density differences. Thus, for example, the method can include centrifuging an aqueous mixture to separate components with lower densities.

Figure 2:
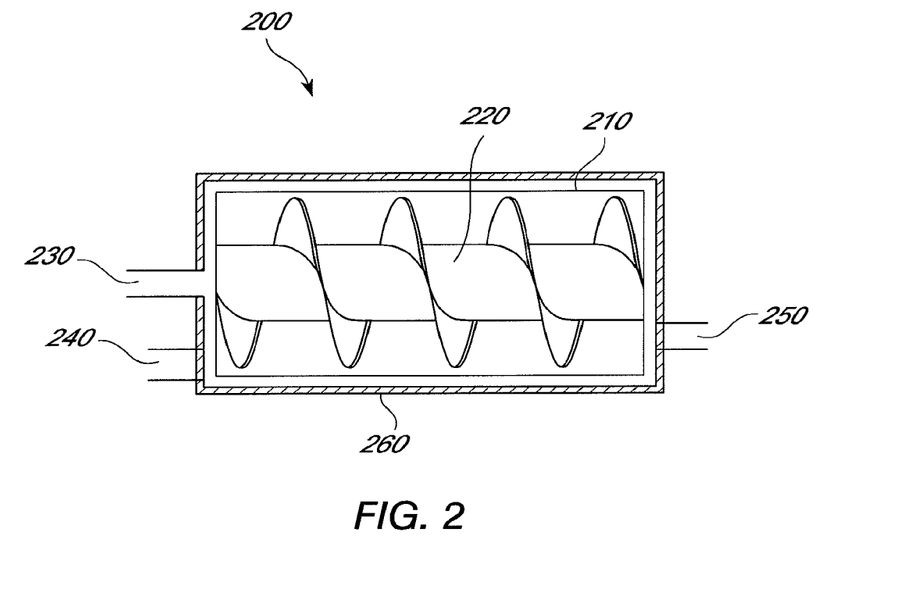
FIG. 2 is an illustrative embodiment of a screw pump that may be used in a process for isolating nanoparticles.

FIG. 2 is an illustrative embodiment of a screw pump that can be used in the method of the present application. Screw pump 200 includes housing 210 containing screw 220. Inlet conduit 230 can be used to flow the aqueous mixture into housing 210. Screw 220 can be rotated, such that centrifugal force and flow are generated, causing denser components to flow out of conduit 240, while less dense components flow out of conduit 250. Housing 210 may optionally include insulating layer 260 to maintain a relatively constant temperature. Accordingly, the aqueous mixture having ice crystals can enter screw pump 200 through inlet conduit 220. A concentrated solution of ice crystal can exit conduit 250, while a solution having a reduced concentration of nanoparticles can exit conduit 240.

Figure 3:
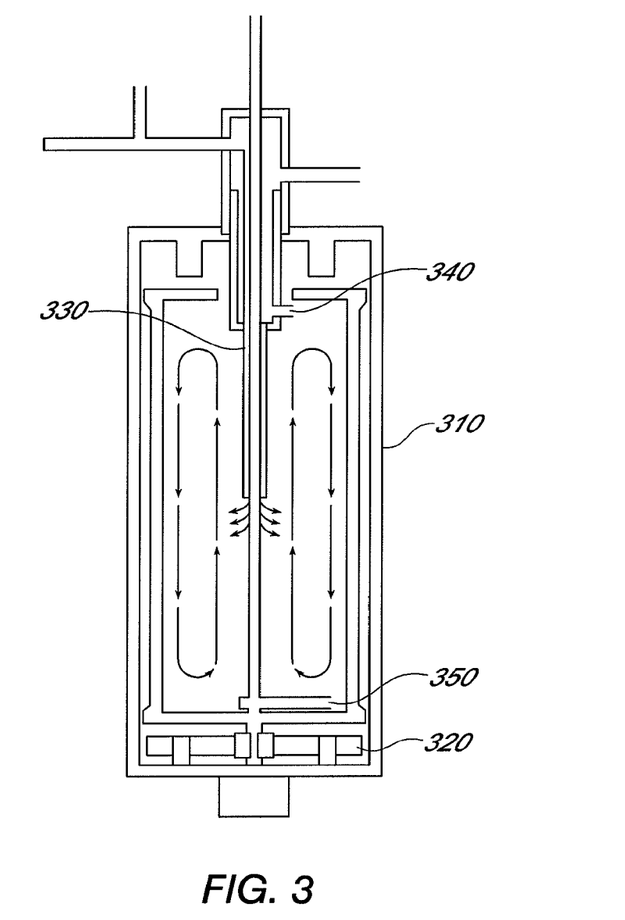
FIG. 3 is an illustrative embodiment of a centrifuge that may be used in a process for isolating nanoparticles.

FIG. 3 is another illustrative embodiment of one centrifuge that can be used in the method of the present application. Centrifuge 300 can include rotating body 310 which is driven by motor 320. Inlet conduit 330 can feed fluid into rotating body 310. A less dense fluid can be withdrawn at upper conduit 340, which includes an opening closer to the axis of rotation. A denser fluid can be withdrawn at lower conduit 350, which includes an opening further away from the axis of rotation relative to upper conduit 340. Accordingly, an aqueous mixture having ice crystals can be feed through inlet conduit 330 and a concentrated solution of ice crystals can be withdrawn through upper conduit 340.

Although examples of screw pumps and centrifuges are provided, the present application is not limited to any particular device. Generally, any method of isolating the ice crystals based on the specific density and/or size can be suitable for the processes in the present application.

In some embodiments, the ice crystals can be isolated based on their size. For example, the aqueous mixture can be filtered to remove ice crystals above a certain size. As a specific example, an aqueous solution of ice crystals with a diameter of about 10 μm in diameter can be passed through a filter with an average pore size of about 1 μm to remove the ice crystals.

The processes of the present application are advantageous, in some embodiments, because they permit using a filter configured to remove components larger than the size of the nanoparticles (e.g., the filter has a pore size larger than the nanoparticles). The processes of the present application can include, for example, a filter configured to remove components larger than about 1 μm. In contrast, a conventional method of filtering nanoparticles from solution (e.g., a solution without any ice crystals) could require a filter configured to remove components less than about 100 nm. Generally, filters configured to remove smaller components require greater pressures and/or lower flow. Thus, forming ice crystals may provide for more efficient filtration.

Accordingly, the filter for isolating the ice crystal can be configured to remove the ice crystals. In some embodiments, the filter is not configured to remove nanoparticles in the liquid phase of the aqueous solution (e.g., nanoparticles that are not contained within an ice crystal). The filter for isolating the ice crystal can be configured to remove, for example, components having a size of at least about 1 μm; at least about 4 μm; at least about 8 μm; at least about 10 μm; at least about 12 μm; or at least about 15 μm. For example, the filter may be configured to remove components larger than a specified size because the filter has an average pore size below the specified size.

The aqueous mixture can be at a temperature effective to maintain the presence of ice crystal during the isolating step. For example, the temperature during the isolating step can be sufficiently cool to prevent the ice crystal from melting. In some embodiments, the temperature can be maintained at about the same temperature that the aqueous solution was adjusted to in step 120 in FIG. 1. For example, the aqueous mixture may be initially cooled to about −2° C. to form ice crystals, and then the aqueous mixture can be maintained at about −2° C. during the isolating step (e.g., centrifuging, filtering, etc.). The aqueous mixture can be maintained at a temperature of, for example, equal to or less than about 0° C.; equal to or less than about −0.1° C.; equal to or less than about −0.2° C.; equal to or less than about −0.3° C.; equal to or less than about −0.5° C.; equal to or less than about −1.0° C.; equal to or less than about −1.5° C.; equal to or less than about −2.0° C.; or equal to or less than about −2.5° C. The aqueous mixture can be maintained at a temperature of, for example, equal to or greater than about −40° C.; equal to or greater than about −30° C.; equal to or greater than about −20° C.; equal to or greater than about −10° C.; equal to or greater than about −8° C.; equal to or greater than about −5° C.; or equal to or greater than about −3° C.

As would be appreciated by the skilled artisan, guided by the teachings of the present application, various isolating steps can be combined or repeated to further purify the aqueous mixture. For example, multiple centrifuging steps can be completed to successively reduce the amount of nanoparticles. As another example, the aqueous mixture can be initially filtered and then centrifuged, or the aqueous mixture can be initially centrifuged and then filtered. The one or more isolating steps can be completed in a continuous process or in batches.

In some embodiments, the process of the present application isolates at least about 50% of the nanoparticles in the aqueous mixture. In some embodiments, the process of the present application isolates at least about 60% of the nanoparticles in the aqueous mixture. In some embodiments, the process of the present application isolates at least about 70% of the nanoparticles in the aqueous mixture. In some embodiments, the process of the present application isolates at least about 80% of the nanoparticles in the aqueous mixture. In some embodiments, the process of the present application isolates at least about 90% of the nanoparticles in the aqueous mixture. In an idealized embodiment, the process of the present application isolates about 100% of the nanoparticles in the aqueous mixture.

In some embodiments, the process of the present application (e.g., the process depicted in FIG. 1) may be repeated to further purify the aqueous mixture. For example, the process could remove 90% of the nanoparticles for each cycle of forming and isolating ice crystals. Repeating the process a second time could provide about 99% removal of the nanoparticles. The process can be completed once, twice, three times, or more to remove nanoparticles. In some embodiments, the process can be repeated iteratively until the concentration of nanoparticles is below a pre-determined maximum concentration.

The process of the present application may, in some embodiments, be a continuous process. For example, a thermal hysteresis molecule and a mixture including nanoparticles can be added to vessel at a relatively constant flow rate. These components are mixed in the vessel and withdrawn via a conduit coupled to a cooling device. The components can be cooled to form ice crystals while flowing through the conduit at a relatively constant rate. The conduit can be fluidly coupled to a filter that removes the ice crystals.

It will also be appreciated that various additional processing steps can be included before, after, or during the process of the present application. For example, the mixture containing nanoparticles can be initially passed through a coarse filter to remove large solids. Also, in some embodiments, the process may produce a concentrated solution of nanoparticles (e.g., fluid received from lower conduit 350 in FIG. 3 after centrifuging). Conventional methods to remove high concentrations of nanoparticles, such aggregating the nanoparticles, can be implemented to isolate nanoparticles from this concentrated solution. The remaining liquid may then be discarded or recycled through the process for isolating nanoparticles (e.g., the process depicted in FIG. 1).

Composition for Isolating Nanoparticles

Some embodiments disclosed herein include a composition for isolating nanoparticles. The composition can include, for example, a solvent that includes water; a plurality of nanoparticles; and at least one thermal hysteresis molecule.

The composition can generally be any of the compositions prepared according the process of isolating nanoparticles. Thus, for example, the composition can the composition provided in step 110 or step 120 in FIG. 1. Accordingly, the composition can have any of the features described in the present application with respect to the process. For example, the composition can include a solvent that includes at least 80% water by volume. As another example, the composition may include ice crystals or be maintained at a temperature less than or equal to about −1° C.

In at least some of the previously described embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 articles refers to groups having 1, 2, or 3 articles. Similarly, a group having 1-5 articles refers to groups having 1, 2, 3, 4, or 5 articles, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

EXAMPLES

Additional embodiments are disclosed in further detail in the following examples, which are not in any way intended to limit the scope of the claims.

Example 1

Water containing 500 ppb (ppb=0.0000001%) of fullerenes ($C_{60}$) as nanoparticles is treated. Antifreeze glycoprotein is obtained from carrot root (*Daucus carota*) as disclosed in Smallwood, M. et al. *Isolation and characterization of a novel antifreeze protein from carrot (Daucus carota)*, Biochem. J. 340:385-91 (1999). 1 mg/mL of the antifreeze glycoprotein is added to the water while adjusting the pH level to about 7.5-7.9 by adding phosphate-buffered saline, ammonium hydrogen carbonate, or other appropriate buffers. The mixture is stored at −0.3° C. for 40 minutes to form numerous very small ice crystals. At least a portion of these ice crystals include fullerene. The ice crystals are removed with a centrifugal separator.

Example 2

Water containing 100 ppb of gold nanoparticles as nanoparticles is treated. 20 mg/mL of protein obtained from *Typhula ishikariensis* (see U.S. Pat. No. 7,442,769) is added to the water while adjusting the pH level to about 7.9 by adding ammonium hydrogen carbonate, or other appropriate buffers. The mixture is stored at 0.9° C. for 60 minutes to form numerous very small ice crystals. At least a portion of these ice crystals include gold nanoparticles. The ice crystals are removed with a filter.

What is claimed is:

1. A process for isolating nanoparticles from a mixture, the process comprising:

providing an aqueous mixture comprising a plurality of nanoparticles and at least one thermal hysteresis molecule, wherein the aqueous mixture includes an amount of the plurality of nanoparticles less than or equal to about 1 g/L;

adjusting the aqueous mixture to a temperature effective to form ice crystals within the aqueous mixture without solidifying the entire aqueous mixture, wherein the ice crystals comprise at least a portion of the nanoparticles; and isolating the ice crystals from the aqueous mixture, wherein isolating the ice crystals comprises at least one of filtering the ice crystals from the aqueous mixture or applying a centrifugal force to the aqueous mixture to isolate the ice crystals based on specific density differences between the ice crystals and liquid in the aqueous mixture.

2. The process of claim 1, wherein the isolating step comprises separating the ice crystals based on specific density differences between the ice crystals and liquid in the aqueous mixture.

3. The process of claim 1, wherein the isolating step comprises centrifuging the aqueous mixture.

4. The process of claim 1, wherein the isolating step comprises filtering the ice crystals from the mixture.

5. The process of claim 4, wherein the filtering step is configured to remove components having a size greater than about 1 µm.

6. The process of claim 1, wherein the temperature is equal to or less than about 0° C.

7. The process of claim 1, wherein the aqueous mixture is maintained at the temperature during the isolating step.

8. The process of claim 1, wherein the nanoparticles comprise at least one inorganic material.

9. The process of claim 8, wherein the inorganic material is selected from the group consisting of metals and ceramics.

10. The process of claim 8, wherein the inorganic material comprises gold, silver, copper, cadmium, lead, selenium, mercury, or combinations thereof.

11. The process of claim 1, wherein the thermal hysteresis molecule is present in the aqueous mixture at a concentration of at least about 1 µg/mL.

12. The process of claim 1, wherein the aqueous mixture comprises at least about 10 ppm of nanoparticles.

13. The process of claim 1, wherein the thermal hysteresis molecule is an antifreeze protein or an antifreeze glycoprotein.

14. The process of claim 1, wherein the thermal hysteresis molecule is a Type I antifreeze protein.

15. The process of claim 1, wherein the thermal hysteresis molecule is a Type II antifreeze protein.

16. The process of claim 1, wherein the thermal hysteresis molecule is a Type III antifreeze protein.

17. The process of claim 1, wherein the thermal hysteresis molecule is an antifreeze glycoprotein.

18. The process of claim 1, wherein the thermal hysteresis molecule is a synthetic organic compound.

19. The process of claim 1, wherein the thermal hysteresis molecule is a polymer.

20. The process of claim 19, wherein the polymer is a polycarboxylic acid, a polyglycerol, a methyl acrylate-co-vinyl pyrrolidone, a methyl methacrylate-co-vinyl-pyrrolidone, polyvinyl acetate, polyvinyl alcohol, or combinations thereof.

* * * * *

UNITED STATES PATENT AND TRADEMARK OFFICE
CERTIFICATE OF CORRECTION

PATENT NO. : 8,413,462 B2
APPLICATION NO. : 13/132890
DATED : April 9, 2013
INVENTOR(S) : Kusuura Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 11 days.

On the Title Page, in Item (56), under "OTHER PUBLICATIONS", in Column 2, Lines 2-3, delete "J Chem Technol Biotechnol" and insert -- J. Chem. Technol. Biotechnol. --, therefor.

On Title Page 2, in Item (56), under "OTHER PUBLICATIONS", in Column 2, Line 15, delete ""Ploypmpholytes" and insert -- "Polyampholytes --, therefor.

On Title Page 2, in Item (56), under "OTHER PUBLICATIONS", in Column 2, Line 21, delete ""Adsorptioni" and insert -- "Adsorption --, therefor.

Signed and Sealed this
Sixteenth Day of July, 2013

Teresa Stanek Rea
*Acting Director of the United States Patent and Trademark Office*